July 5, 1938.　　　　O. U. ZERK　　　　2,123,129
WHEEL
Filed Aug. 1, 1931　　　　6 Sheets-Sheet 1
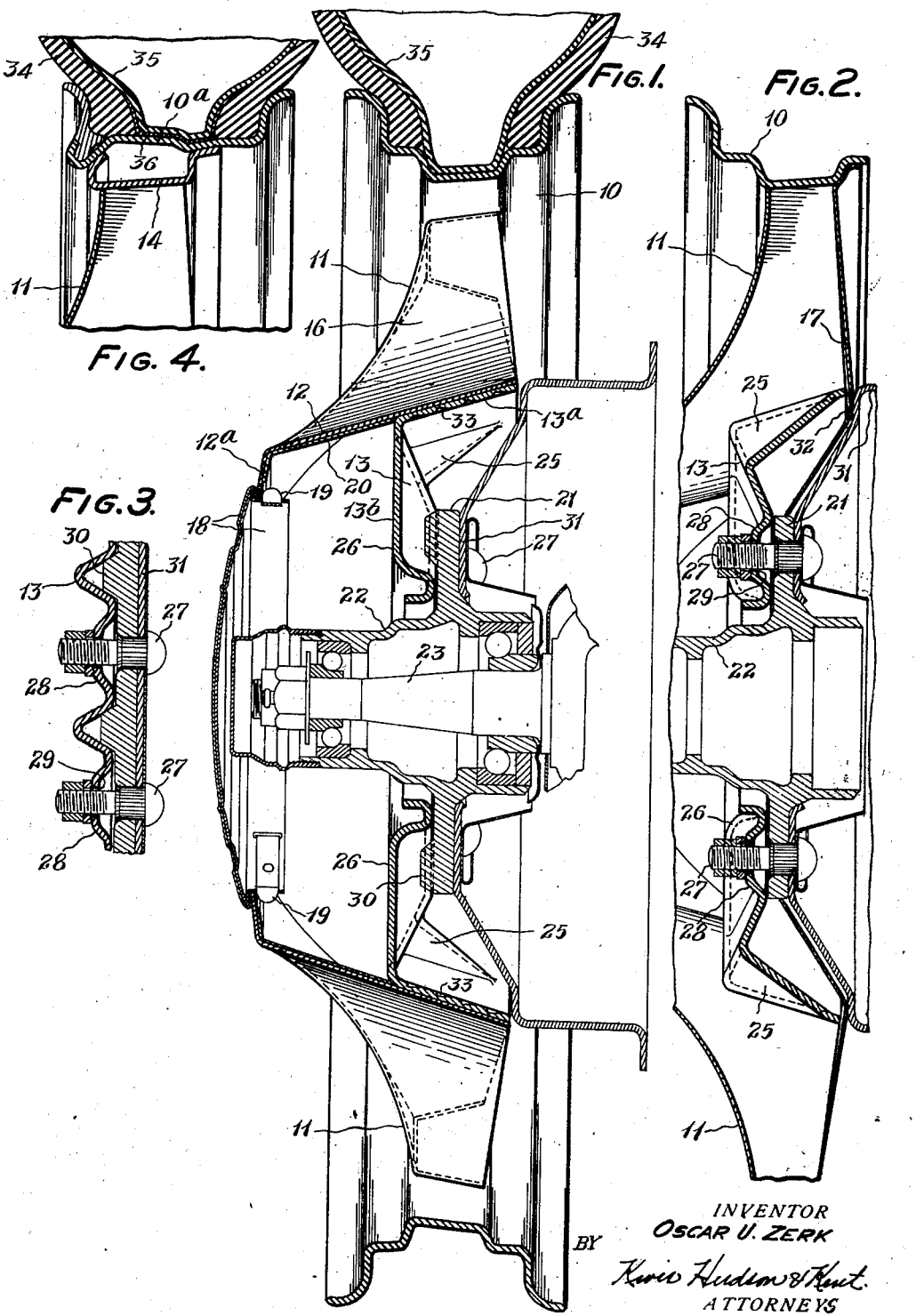
INVENTOR
OSCAR U. ZERK
BY
ATTORNEYS July 5, 1938.　　　O. U. ZERK　　　2,123,129
WHEEL
Filed Aug. 1, 1931　　　6 Sheets-Sheet 2
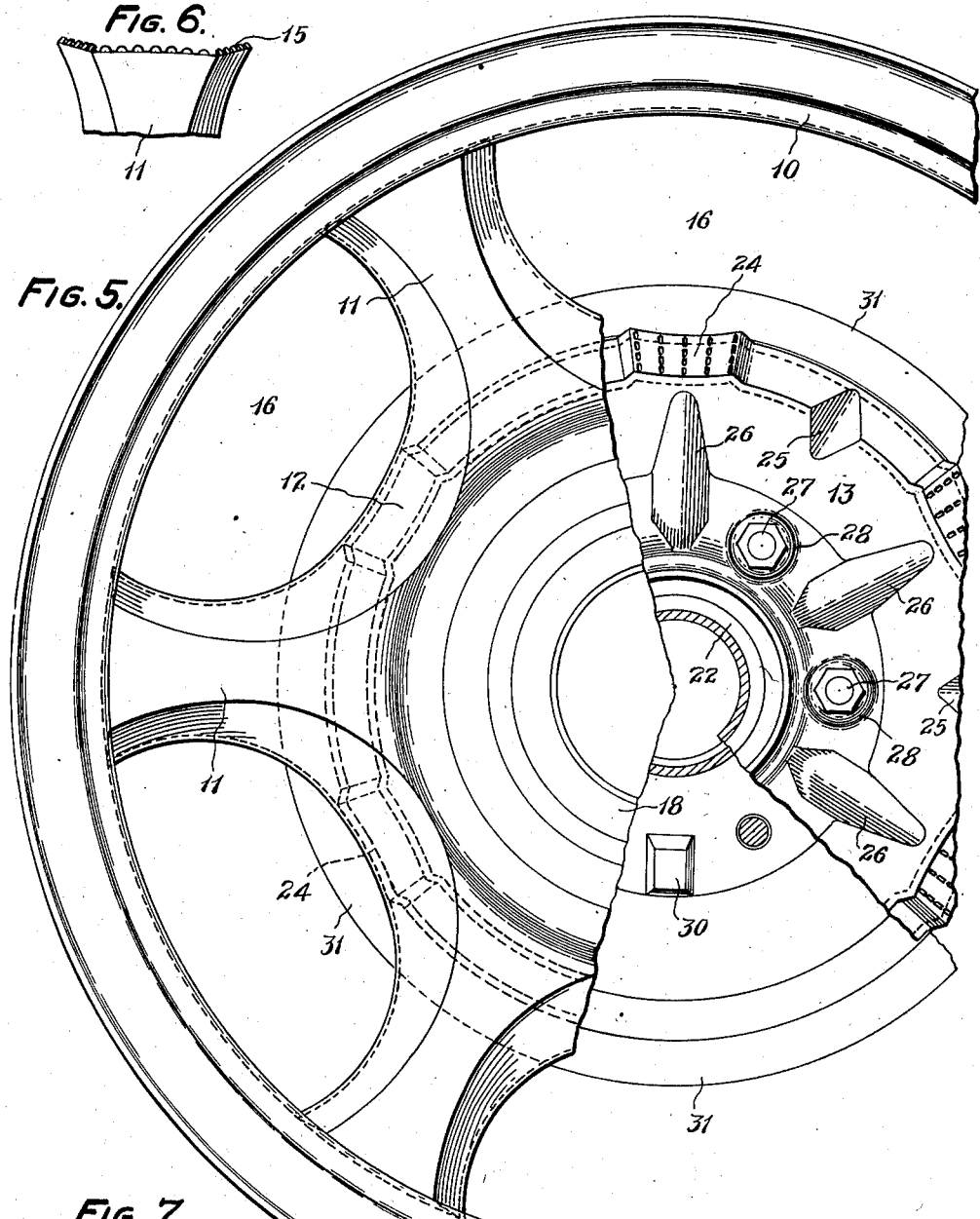
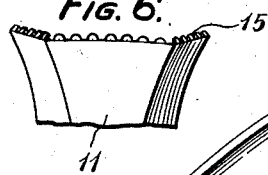
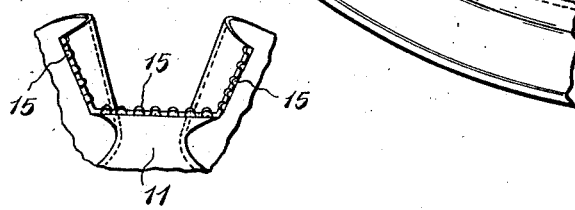
INVENTOR.
OSCAR U. ZERK
BY
*Kwis Hudson & Kent*
ATTORNEYS

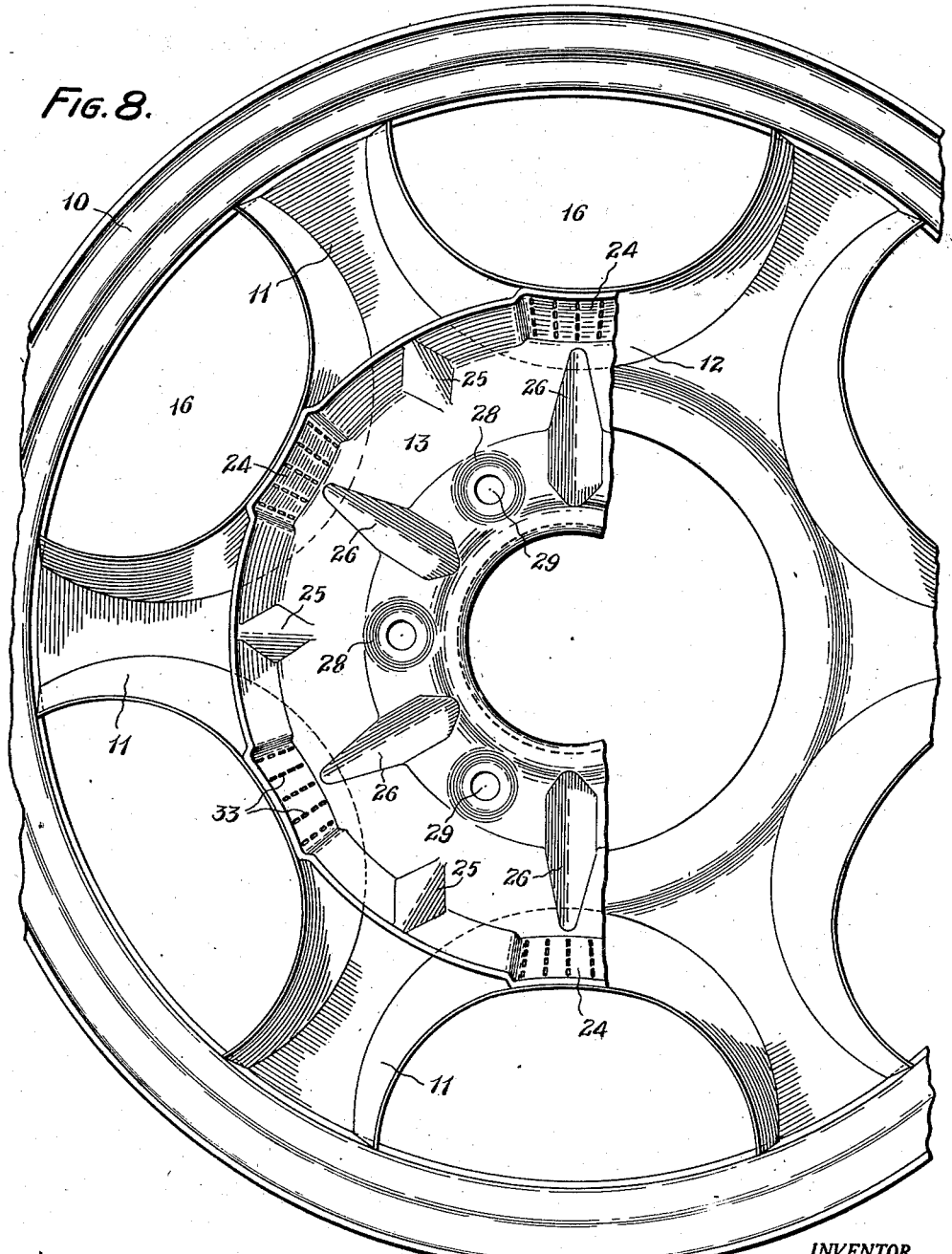

July 5, 1938.   O. U. ZERK   2,123,129
WHEEL
Filed Aug. 1, 1931   6 Sheets-Sheet 4

INVENTOR.
OSCAR U. ZERK
BY
ATTORNEYS

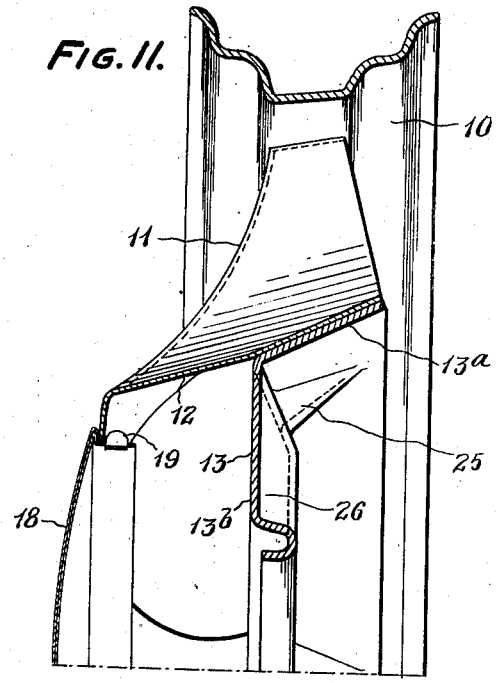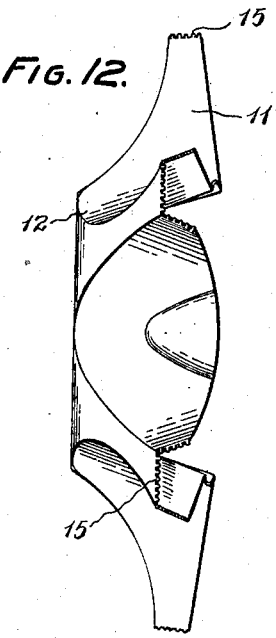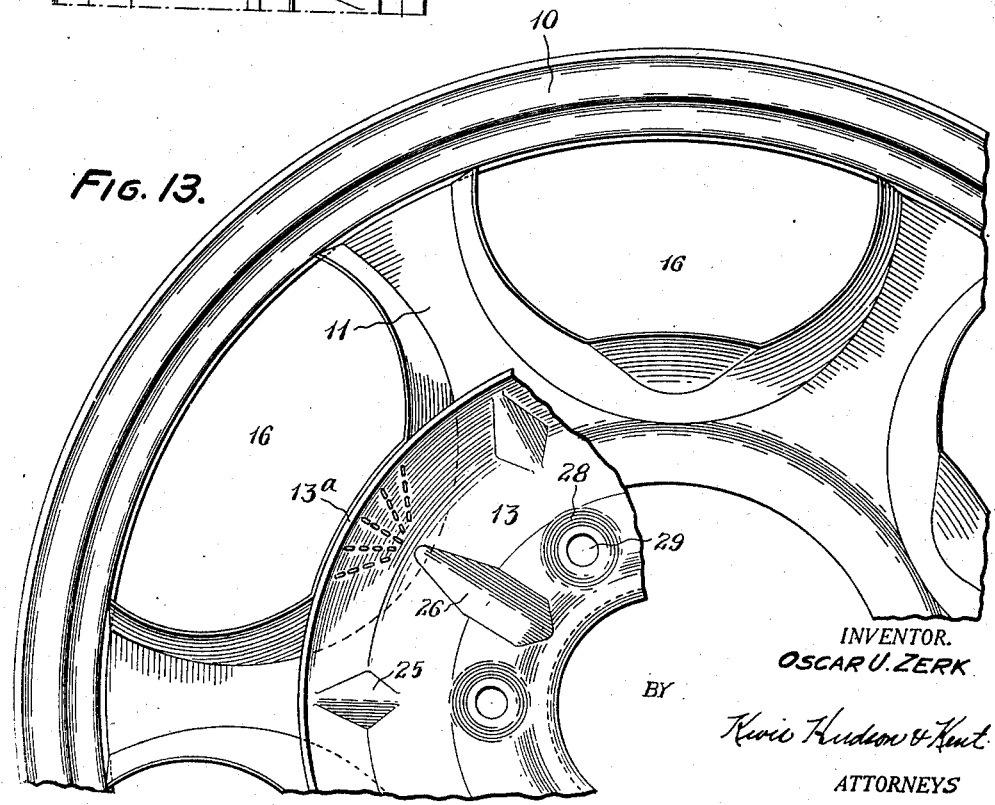

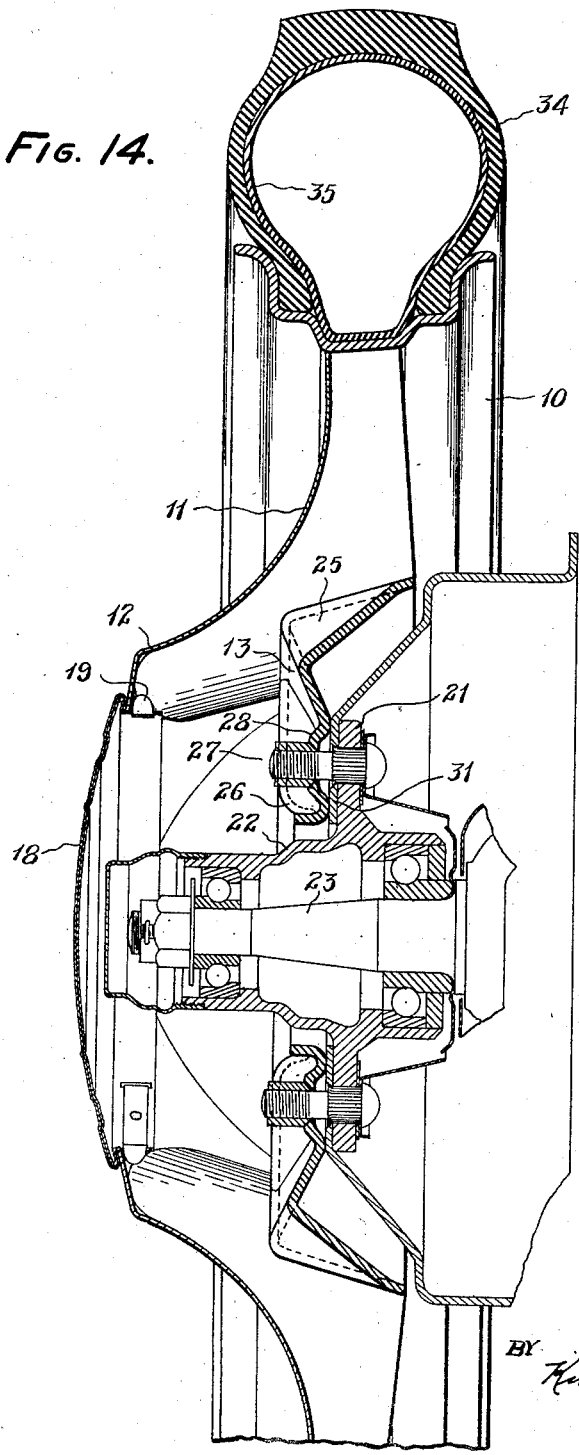

Patented July 5, 1938

2,123,129

UNITED STATES PATENT OFFICE 2,123,129

WHEEL

Oscar U. Zerk, Cleveland, Ohio, assignor, by mesne assignments, to Budd Wheel Company, Philadelphia, Pa., a corporation of Pennsylvania Application August 1, 1931, Serial No. 554,482

13 Claims. (Cl. 301—9)

This invention relates to an improved sheet metal wheel adaptable particularly for automobile or vehicle use and is an improvement on and is designed to replace wheels of various kinds which are being used at the present time, among which are disk wheels, wire wheels, wooden wheels, cast wheels and certain forms of stamped sheet metal wheels.

Disk wheels have not proved to be popular due largely to the fact that they are heavy and are not pleasing in appearance although they are, compared with other wheels, easy to clean.

Wire wheels have up to a few years ago been very little used due to the very large amount of thin wire spokes and the far outstanding hub giving the wire wheel a spiderweb type of appearance. The use of an exceedingly large amount of spokes, the tightening of many nuts and the straightening of the wheel made the first wire wheels very expensive to the manufacturer and very unpopular to the user. The large amount of spokes made it also substantially impossible to clean the wheel. Recent improvements in wire wheels, whereby the number of spokes have been decreased and their thickness increased and other improvements have made the wire wheels at the present time the popular wheel on the market, but with all these improvements the wire wheel is still difficult to clean, its appearance has not materially improved, the excessive amount of individual parts (from 32 to over 100) used in a wire wheel makes it still very expensive to manufacture, and paint or duco finish will soon scale off the spokes, which is a well known fact.

Wooden wheels, while used very extensively in the past, have declined in popularity due to the fact that they are expensive to produce and in the majority of instances are not particularly pleasing in appearance. On the other hand, they have the advantage that they are easily cleaned compared with wire wheels.

Cast wheels are exclusively used for trucks due to their heavy weight. They are also used in connection with detachable rims connected to the wheel with bolts and nuts situated at the rim. The excessive weight of this type of wheel and the very bad appearance of bolts and nuts situated at the periphery of wheels are responsible for the fact that cast wheels are not used for passenger cars.

Stamped sheet metal wheels have been used or proposed for use for a considerable period of time, but have not been used extensively and have not met with the approval of the trade. In many instances the spoke sections have been made of two parts which were riveted, folded or otherwise secured together, and also to the rim or felloe of the wheel. The fact that the spoke portions have been made of two pieces and because wheels of this kind have heretofore been designed to imitate the form of the old-fashioned wooden wheels, which has necessitated clamping and strengthening devices of various kinds, has made the sheet metal wheels the most expensive of any on the market and has also made them considerably heavier than some other types, such as wire wheels. Furthermore, these metal wheels, because of the attempt of the designer to imitate the conventional form of wooden wheels were displeasing in appearance, because a sheet metal wheel imitating the appearance of a wooden wheel always seems to be out of place.

The principal object of the present invention is to provide a stamped sheet metal wheel which embodies the advantages or most of the advantages of the former types of wheels above mentioned and eliminates all of their disadvantages. In brief, it is an important object to provide a stamped metal wheel which preferably consists of only three major parts, which wheel can be produced inexpensively, which is strong and durable in use, and pleasing in appearance.

Another object of my invention is, to use in my wheel a one piece sheet metal member which is composed of spokes and a relatively large central portion which acts as an outer hub.

Another object of my invention is, to use in this construction U shaped spokes with preferably flared side portions.

Another object of my invention is, to use a wheel fastening flange with a conical circumferential portion which will be welded into a preferably conical portion of the outer hub cap portion.

Another object of my invention is, to make the spokes at the open end larger than below the open end in order to increase the welding area of the spokes to the rim to a maximum.

Another object of my invention is, to use a one piece star having an integral outside hub portion which is so large that the wheel fastening screws and nuts can be placed inside of the large hub portion of the star.

Another object of my invention is, to use in combination with a rim and a one piece star, with relatively large outside hub portion, a wheel fastening flange which is fastened to the spoke and outer hub member only at places between the spokes.

Another object of my invention is to form the spokes of the sheet metal member in such a manner as to give the metal wheel a certain degree of resiliency which is an important feature because it relieves the wheel from excessive shock strains which are especially noticeable when the tires used on this wheel should become deflated.

Another object of my invention is, to add the resiliency of my wheel to the resiliency of the preferably air inflated tires used in combination with my wheel.

Another object of my invention is to use common means such as bolts and nuts to connect my wheel to the inner hub and brake drum of a vehicle.

In the attainment of the above objects, I provide a wheel having many distinctive features, among which is a spoke and outer hub element formed in one piece from stamped metal and composed of a series of spokes and an inner part constituting the outer hub portion. This outer hub portion has preferably an inwardly extending part in the form of a flange which is designed to be secured by bolts and nuts to the flange of the inner hub or hub proper, depending upon the diameter of the inner hub flange. This inwardly extending portion may be and in some cases preferably is a separate member in the form of a stamping secured to the outer hub portion. These two stamped members, together with the rim or felloe to which the outer ends of the spokes are secured, form or constitute the wheel, aside from a few relatively minor parts which are or may be included, such as a hub cap attached to the outer hub portion and thin metal stampings which may be applied to close the spokes. While in my construction the wheel fastening screws are situated inside of the outer hub portion it is in the scope of my invention that the use of a stamping composed of spokes and an outer hub can also be used with any construction where the wheel fastening screws are situated outside of the outer hub. This specific construction is described and claimed in detail in my co-pending application Serial No. 562,315 filed September 11, 1931, which matured into Patent No. 2,112,615, March 29, 1938.

The three main parts of the wheel mentioned above, namely, first, the rim, second, the combined spoke and outer hub element and, third, the hub attaching member may be secured together in any suitable way but preferably by welding operations and in the preferred construction they are so formed that uniting of these three parts is accomplished with two welding operations in one of which the spokes are attached at their outer ends to the rim or felloe and in the other the wheel attaching member is secured at a plurality of places to the outer hub portion.

The spokes are preferably substantially U or trough-shaped in cross-section, the closed portions of the spokes facing outwardly and the open portions facing inwardly or toward the chassis. The sides of the spokes are preferably flared outwardly so as to give the requisite strength to resist torsional or circumferential stresses without requiring a metal stamping of excessive thickness. Additionally, the spokes on the closed side are flared outwardly toward the outer end of the hub portion, thus giving great strength to resist stresses due to side swaying of the vehicle body and chassis. Furthermore, the sides of the spokes, when viewed from the front or rear, are somewhat hour-glass shaped in that they flare outwardly or get somewhat wider from a point intermediate their ends toward the outer ends of the spokes and also toward the inner ends, this providing the necessary large contacting area with the rim or felloe where the welding is accomplished to provide exceedingly strong joints where the spokes are united with the rim or felloe.

The invention may be further briefly summarized as consisting in certain novel details of construction and combinations and arrangements of parts which will be described in the specification and set forth in the appended claims.

In the accompanying sheets of drawings, wherein I have shown the preferrred embodiment of the invention and also a slight modification, Fig. 1 is a sectional view through the wheel, hub cap and spindle, the section being taken substantially along the lines A—A of Fig. 5 between the spokes;

Fig. 2 is a similar sectional view omitting portions of the wheel, the section being taken substantially along the line B—B of Fig. 5 through the spokes;

Fig. 3 is a curved section, substantially along the line C—C of Fig. 5, through the wheel fastening means, i. e., through the means by which the wheel is detachably secured to the flange of the inner hub or spindle bearing;

Fig. 4 shows a cross section of a split rim and a felloe welded to the rim and the spokes welded to the felloe; a tire, a tire tube and a tire flap attached to the rim, this view showing a slight modification over that shown in the figures referred to above;

Fig. 5 is a view looking toward the outer side of the wheel with portions broken away;

Fig. 6 is a front elevation of the outer end of the spoke before it is welded to the rim or felloe, this view showing protuberances at the edge of the open end of the spoke, as is preferred for effective welding;

Fig. 7 is a fragmentary portion of the spoke and outer hub element, looking down onto the end of the spoke;

Fig. 8 is a view similar to Fig. 5 but looking at the wheel from the inner side, parts being broken away or omitted for the sake of clearness, and the wheel being detached from the flange of the spindle bearing or inner hub;

Figure 9:
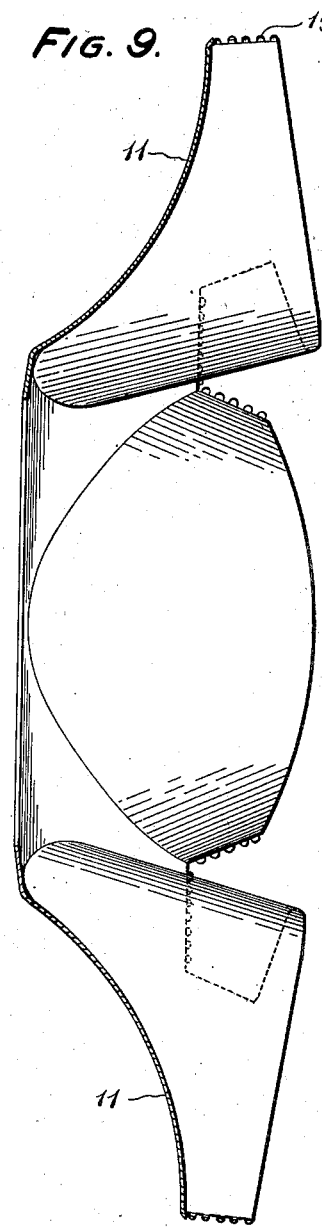
Fig. 9 is a sectional view through the sheet metal unit consisting of the spokes and the outer hub, the section being taken through the spokes.

Fig. 11 being a partial sectional view taken between the spokes;

Fig. 12 being an edge view of the spoke and outer hub unit, showing how the outer hub is deformed by being pressed upwardly or outwardly to accommodate the conical outer flange of the wheel attaching stamping;

Fig. 13 being a view looking toward the rear side of the wheel with the wheel attaching stamping welded to the outer hub in this modified manner, portions being broken away;

Fig. 14 shows a cross section of a wheel having somewhat more slender and, therefore, more resilient spokes as shown in Figs. 1 and 2, also a tire and a tire tube. This section also shows a brake drum in direct contact with the wheel fastening flange of the wheel and both members connected to the inner hub flange with common wheel fastening bolts and nuts.

Referring now to the drawings, first to Figs. 1 to 5 and 8, 10 represents the rim which may be formed of a rolled section, as is customary, this forming one of the three main elements of my improved wheel. The second element is stamped from sheet metal and is composed of spokes 11 of which there may be any number, but preferably a reduced number, such as five, six or seven, six being herein illustrated, these spokes at their inner ends merging into and in effect forming the outer hub portion 12 which forms a cavity in which are located and concealed from view when the outer hub cap is applied the bolts or other attaching devices by which the wheel is attached to the flange of the spindle bearing or inner hub. Usually the outer hub of a modern wheel consists of a continuous cup shaped stamping. In my construction what I term outer hub is the inner portion of the spoke stamping, which is continuous at the outer end but non-continuous at the inner end, the non-continuous portions resulting from the hollow spaces formed by the outwardly extending spokes. The angle of the outer hub to the center line is in my construction about 17°. My outer hub can also be made cylindrical. The third main part of the wheel is the wheel attaching member in the form of stamping 13.

As stated above, the outer ends of the spokes are secured to the rim preferably by welding and the wheel attaching member or stamping 13 is attached to the outer hub portion 12 preferably by welding. Instead of welding the outer ends of the spokes to the rim, they may be welded to a felloe such as shown at 14 in Fig. 4, which may carry the rim 10a, and it will be understood that where I use the word "rim" in the claims it is intended to cover either a rim such as 10 or a felloe such as 14. For convenience of description, the spokes will be hereinafter referred to as being welded to the rim, but the term "rim" when so used, is understood to include a felloe (if one is desired) which in turn is designed to be welded to the rim.

Though the details and steps of the welding operations constitute the subject matter of a companion application, it may be mentioned that the ends of the spokes are preferably provided with a series of inwardly inclined protuberances 15, these being melted away during the welding operation. Additionally, the spokes are otherwise somewhat longer before the welding operation than after, as some of the metal of the spoke body is melted to insure a perfect weld. Likewise, the ends of the spokes and the inner circumferential portion of the rim to which the spokes are welded are preferably on a slight taper, as will be observed particularly from Figs. 1 and 2, the taper on the spoke being at the same angle as the taper on the portion of the taper of the rim as it is intended that the ends of all the spokes, no matter how many there may be, be simultaneously welded to the rim in one operation, the spoke element and rim being moved against each other relatively in an axial direction during the welding operation with the tapered surfaces contacting, during which time the protuberances and a small portion of the spokes themselves are melted away, but the relative movement of the spoke element and rim during this welding operation and the shape of the spokes (flared sides) are such that all flash and burr are on the inside of the spokes, leaving the outerside clean.

As already pointed out, the spokes are substantially U or trough-shaped with the opening of the trough on the inner side of the wheel. The sides of the spoke are flared outwardly, the purpose being not only to facilitate welding and make a clean joint, as explained above, but also to enhance the strength of the welded point in resisting torsional or circumferential stresses to which the weld is subjected in transmitting the driving load. The closed wall or back of the U is on the outer side of the wheel, and this, it will be seen flares outwardly from the outer end of the spoke to the inner end where the spokes form the outer hub portion 12. Thus the base of the spoke is comparatively wide and is in the best possible form to resist stresses due to swaying of the car body and chassis. That is to say, the cross-sectional size of the spoke gradually increases from near its outer end to its inner end as is desired to resist stresses which are progressively greater from the outer end to the inner end of the spoke. This is of importance not only where the spoke is of generally U-shape but also where the spoke has a closed or box section, as may be obtained by closing the spokes by welding or otherwise securing to the inner portions thereof inner or closing walls, as, for example, as illustrated in my copending application Serial No. 561,541, filed September 8, 1931. As can be seen in Fig. 14, I made the depth of the U shaped form below its weld substantially the same or at least very little larger than on the welded joint at the circumference of the wheel.

Additionally, the spokes, when viewed from the front or rear, flare in both directions from a point intermediate the ends of the spoke, i. e., the spokes being smaller in cross-section intermediate their ends than at their outer or inner ends. This flaring of the spokes outwardly from the intermediate point is wanted to give the desired large surface contact between the spoke ends and the rim in order that welded joints of ample strength will be provided. The considerably reduced width of the spokes at their intermediate points give the wheel a certain degree of resiliency which is enhanced by making the depth of the spokes at their intermediate points not materially deeper than at their extreme welded ends as can be seen on Fig. 14.

It is important that a wheel possesses a certain degree of resiliency in order to relieve the wheel from excessive road shocks, which are especially noticeable when the tires used on this wheel should become deflated. To this inherent resiliency of my wheel I add the resiliency of the air inflated tires with the result that the total resiliency of a tire when mounted on my wheel is materially increased. The combination of my resilient wheel with a solid or air inflated tire is, therefore, an important part of my invention. Fig. 4 shows this combination with tire 34, tire tube 35 and tire flap 36, while Fig. 14 shows this combination with tire 34 and tire tube 35.

As the spoke and outer hub stamping is made by me, there are substantially U-shaped openings 16 between the spokes. These openings and the open sides of the spokes may be closed by a thin sheet metal closure member 17 shown in Fig. 2, which may be readily placed over the inner hub flange 21 but between the brake drum 31 and the spokes 11 in such a manner that pressure is applied by the brake drum against the bent portion 32 of the double coned disk shaped closure member 17.

It might be mentioned in passing that the cross-section of the spoke at any point consists of substantially straight lines instead of curved lines, it being a recognized fact that the straight line section gives a more pleasing appearance to the spoke than the curved spoke and also makes the section much stronger.

It will be observed that the outer hub portion 12 of the spoke and outer hub element is conical or on a taper as is most clearly shown in Fig. 1, but the surface in the conical wall is not continuous except at the outer end of the outer hub portion where the latter terminates in a continuous inturned ring 12a to which a hub cap 18 may be applied and held in place by the common form of snap fastener indicated at 19. The outwardly flared walls of the spokes bring or locate the ring 12a and hub cap 18 at the extreme outer end of the wheel which is outside of the rim 10 or 10a, as will be seen by reference to Fig. 1. It was mentioned that the inner wall of the outer hub portion 12 is conical but not continuous. This wall inwardly of the continuous ring 12a is made up of convex or curved portions when viewed from the inside which portions lie between and cause one spoke to merge into another, and between these portions there are openings which extend up and communicate with the channels of the spokes. These openings may be closed by a thin sheet metal closure member 20 which can be readily welded or pressed into place so as to prevent dirt and the like entering the spoke from the open inside and passing down into the cavity or space within the outer hub 12.

I prefer to use in the manufacture of the spoke and outer hub stamping a thin sheet steel of about one-sixteenth inch thickness or less which does not readily crystallize, that is, a steel of high fatigue value and high endurance limit, such as chrome nickel steel, having a tensile strength of about 140,000 pounds per square inch.

The outer hub portion 12 of the wheel is connected with the inner hub 22 by means comprising a stamping 13, a flange 21 and suitable bolts as hereinafter described. The flange 21 may be secured to the inner hub 22 in any preferred manner and for convenience I have shown it as integral with the inner hub.

Taking up now the construction of the stamping 13 and the manner of securing it to the outer hub 12, it will be observed that the member 13 has an outer or circumferential flange 13a which is conical, the taper being the same as the taper or conical angle of the outer hub portion 12. Additionally, the stamping has an inwardly extending flange 13b which is deformed for strengthening and other purposes, as hereinafter explained, and is designed to be secured to the flange 21. The circumferential part or flange 13a of this stamping 13 is attached to the outer hub portion 12 preferably by welding, the welded surfaces occurring midway between the spokes as illustrated in Figs. 5 and 8. The circumferential portion 13a of this stamping extends from the inner or large end of the conically shaped outer hub 12 to about one-half the distance to the outer or smaller end of the outer hub 12 and a given width of the circumferential portion of the stamping is welded for this entire distance. In order that the welding may be accomplished between the spokes, it is desirable that the outer hub 12 and the circumferential portion 13a of the wheel attaching stamping 13 have the identical taper or form of the entire surface where these parts are to be welded together. This makes it necessary to deform the portions of the convex outer surface of the circumferential portion 13a of the stamping 13 so that they will conform to and engage corresponding portions of the inner convex parts of the outer hub 12 between the spokes, (see particularly Figs. 5 and 8) over the entire area of the former which is to be welded at a plurality of places to the latter or, conversely, by deforming the inner convex portions of the outer hub 12 so as to match the conical or convex outer surface of the part 12a of the stamping 13. The former procedure is preferred and is illustrated in Figs. 5 and 8, where the flange 13a of the stamping 13 is deformed or pressed inwardly by giving it, as indicated at 24, a conically shaped concavity of proper size to match the adjacent convex surface of the outer hub 12, this being done between all of the spokes. Furthermore, the deformed portions 24 are preferably depressed outwardly at a large number of spots 33 to form slight protuberances like the protuberances 15 at the outer ends of the spokes and during the welding operation when the parts are moved relatively, causing the conically shaped portions to slide into engagement, the protuberances are melted away. Thus in this one welding operation and during this one movement the parts are welded together simultaneously over a given area between each pair of spokes immediately inwardly of the portion of the rim to which the outer ends of the spokes are attached, each welded area extending circumferentially a suitable distance and also extending downwardly along the cone surface of the outer hub 12 for about one-half of its length, axially considered.

It will be noted that the portion 13a is situated substantially in a plane between the extreme outer ends of the spokes 11 and the inner hub flange 21 and is given sufficient width in order when welded to the outer hub portion 12 to strengthen same as much as possible.

In this manner, an extremely rigid and effective union is established between the combined spoke and outer hub stamping and the wheel attaching stamping, the character and strength of the union at all the different welded spots being uniform and amply able to withstand the stresses to which the wheel may be subjected.

It was stated above that, instead of deforming the flange 13a of the wheel attaching stamping where the welding is to be accomplished to make it conform at the various welding points with the convexity of the outer hub, I may deform the inner convex portion of the outer hub so as to match the conical or convex outer surface of the flange 13a of the stamping 13. This is illustrated in Figs. 11, 12 and 13, wherein the outer hub between the spokes is deformed by being bent upwardly or outwardly or made concave when viewed from the interior of the outer hub, as indicated at 24a, so as to match the conical and convex curvature of the outer surface of the portion 13a of the wheel attaching stamping where the two parts are to contact and be welded together. In this instance, as before, one or the other of the two contacting surfaces may be provided with protuberances which are melted away in the welding operation. The parts in Figs. 11, 12 and 13 are otherwise the same as in the preceding figures and the same reference characters will apply as referred to heretofore.

It was previously mentioned that the shape of the spokes of the combined spoke and outer hub element is such as to give the spokes unusual strength without requiring a stamping of very great thickness. I prefer that the wheel attaching stamping be somewhat thicker than the stamping forming the other element, this being illustrated in the drawings, but in order that this stamping 13, will have the requisite strength without requiring a stamping of undesirable thickness, the stamping 13 is strengthened by giving the outer portion strengthening depressions 25 which are located on the center lines of the spokes or midway between the welded areas 24 (see Figs. 5 and 8) and by giving the inwardly extending flange 13b strengthening depressions 26 midway between the spokes and directly inwardly of the welded portions 24, (see Figs. 5 and 8).

Between the depressions 26 in the flange 13b, the latter is secured to the inner hub flange 21 at a plurality of points by suitable bolts and nuts 27 which are located in line with the spokes, as is obvious from Fig. 8. Where the bolts pass through the flange 13b of the wheel attaching stamping, the latter is bowed outwardly for strengthening purposes, as illustrated at 28. Bolt openings 29 are provided in these portions. To keep the flange 13b which extends inwardly from the outer hub, and the flange 21 which extends outwardly from the inner hub from turning relatively, and to relieve the bolts of shearing stresses, these parts are preferably interlocked, this being accomplished in this instance by providing tapered lugs 30 on the flange 21 which fit into tapered depressions of the flange 13b and in this instance engage tapered walls formed by the strengthening deformations given to the flange 15b, as best shown in Figs. 1 and 3. This specific construction is described and claimed in my copending application Serial No. 581,400, filed Dec. 16, 1931. It is to be noted that the wheel attaching bolts and nuts are situated in the conical cavity defined by the outer hub and are concealed from view when the hub cap is in place.

The same bolts which attach the wheel to the flange of the inner hub portion are utilized in this instance to secure to the flange of the inner hub the brake drum 31 shown in Figs. 1 and 2 and a portion of which is also shown in Fig. 5.

In Figs. 1, 2, and 3, I show the wheel fastening flange 13b adjoining the inner hub flange 21, which in turn adjoins brake drum 31. The inner hub flange is therefore situated between the wheel fastening flange 13b and brake drum 31. In Fig. 14 I show the wheel fastening flange 13b adjoining the brake drum 31, which in turn adjoins the inner hub flange 21. In Fig. 14, the brake drum is situated between the wheel fastening flange 13b and the inner hub flange 21.

Figure 10:
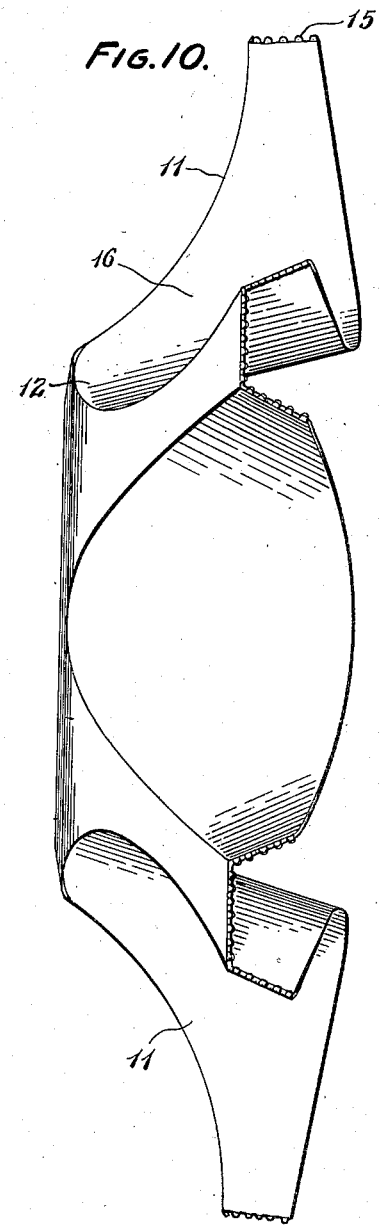
Fig. 10 is a view of the same unit showing the same in elevation, an edge view being shown.

From the foregoing it will be noted that I have herein provided an improved wheel constructed entirely by sheet metal stamping processes wherein a wheel body comprising a spider as shown in Figs. 9, 10 and 12, is made of a single sheet of sheet metal, the spider comprising an outer hub or nave 12 which is of a deeply dished generally conical form, said spider also including a plurality, which may be any number, of channelled spokes 11, said spokes merging very gradually and, as shown preferably, curvilinearly with the outer hub 12, in such a way that localization of fatigue stresses in the regions of joinder between the spokes and outer hub is substantially eliminated as compared with sheet metal wheels in the past proposed and many of which closely follow the usual forms of wood-spoked wheels.

To accomplish this I have pressed outwardly from the material of the conical outer hub, at circumferentially spaced portions thereof, what may be termed channelled spoke roots, disposed radially within the peripheral portion of said outer hub which is of greatest diameter, said spoke roots being in the form of channels of gradually increasing axial and radial depth, i. e., gradually increasing cross-sectional form, the axially outer wall of said root channels generally extending axially inwardly at a lesser rate than the portions of the outer hub disposed between said spokes, due to a gradual general divergence of said spoke root outer walls from the conical configuration of outer hub determined more particularly by the portions of the outer hub disposed between and interconnecting said spokes, as viewed for instance in Fig. 1 at 12.

The gradual emergence of the spoke roots is moreover accomplished by so forming the lateral walls of said roots, as to cause them to curvilinearly and gradually merge with outwardly pressed portions of the outer hub which are disposed between the spokes and adjacent thereto.

The channelled spoke roots of gradually increasing depth as before stated, continue radially outwardly to the zone of the radially outer portion of the outer hub which is of greatest diameter, where said root portions are of greatest axial depth and where they smoothly merge with the main bodies of the spokes 11 which continue in channelled form to the spoke ends being there joined to the annulus 10, herein shown as a tire rim.

The main bodies of the spokes 11, which are, as stated, of channelled form, and therefore of high section modulus, are of substantially less axial depth than that of the generally conical hub, and the side walls of said channelled spokes are so gradually and non-abruptly merged with the intermediate portions of the conical outer hub 12, as to prevent substantial localization of fatigue stresses in the regions of joinder of said spokes and outer hub.

It is to be noted that both side walls of the spokes 11 at their ends are rigidly secured against lateral spreading by the welding of said side walls to the radially inner surface of the tire rim 10.

Also, the lateral walls of the spokes are prevented from lateral spreading, both by the laterally extending curvilinear connecting portions of the outer hub between the adjacent spokes which are joined to said walls, being preferably in the form, as stated, of sweeping curves on a considerable radius, and also by tying together of the sides of the spokes by the effect of welding the portions 24 of the reinforcing bolting-on flange 13.

It is to be noted also that the outer hub is substantially circumferentially continuous at its end which is of least diameter, but becomes more and more corrugated by the emergence of the spoke roots and main spoke bodies in portions more nearly approaching the portion of the outer hub which is of greatest diameter. The high section modulus of the outer hub otherwise accruing from its generally deeply dished conical form, is, however, substantially maintained, in spite of said corrugations, by the reinforcing effect of said annular bolting-on flange welded by portions 24 at the sides of each of said spokes.

Previously herein I have stated that the inwardly extending bolting-on flange portion of the wheel may be and in some cases preferably is a separate member from said spider, but where the spider is made unitary I contemplate that said spider will necessarily be made of thicker stock than is necessary where the additional reinforcement of the conical outer hub resulting from the welding of the separate bolting-on flange between the spokes is employed.

Thus it will be seen that the objects stated above are obtained very effectively with the present invention. It will be particularly apparent from the above description and the drawings that a stamped metal wheel of great strength and pleasing appearance is provided, and by reason of the small number of parts of which the wheel proper is composed and the manner in which the parts are assembled or united, that I am able to produce a wheel which is inexpensive and of a construction that is well adapted for quantity production.

While I have shown the preferred construction and slight modifications, I do not desire to be confined to the precise details of construction and arrangements of parts illustrated and described, but aim in my claims to cover all modifications which do not involve a departure from the spirit and scope of the invention.

Having thus described my invention, I claim:

1. In a vehicle wheel, a stamping having a plurality of spokes formed integrally with an outer hub with concavely convexly formed portions between the spokes, and a single wheel attaching member secured to said concavely convexly formed portions, and constituting the sole support for the wheel, the latter portions and the wheel attaching member having similarly shaped engaging portions secured together by welding.

2. In a vehicle wheel, a sheet metal member consisting of a plurality of integrally formed spokes and an outer hub, the latter being conically formed and extending outwardly and laterally of the rim, and a wheel attaching member having a conically shaped portion secured to the outer hub and an inwardly extending portion for detachably connecting the same to an inner hub, said wheel attaching member being deformed to strengthen it, the deformed portions being positioned in line with the spokes and extending across the dividing line between the conical and the inwardly extending portions of the wheel attaching member.

3. In a vehicle wheel, a rim, a sheet metal member consisting of a plurality of integrally formed spokes and an outer hub, the latter being conically formed and extending outwardly and laterally of the rim, and a wheel attaching member having a conically shaped portion secured to the outer hub and an inwardly extending portion for detachably connecting the same to an inner hub, the conically shaped portion being deformed in line with the spokes and the inwardly extending portion being deformed between the spokes.

4. In a vehicle wheel, a sheet metal member consisting of a plurality of integrally formed spokes and an outer hub, a single wheel attaching member, constituting the sole support for the wheel, secured to the outer hub, the outer hub and wheel attaching member having attached engaging portions one of which is deformed to conform to the other.

5. In a vehicle wheel, a sheet metal member consisting of a plurality of integrally formed spokes and an outer hub, a single wheel attaching member, constituting the sole support for the wheel, secured to the hub, said wheel attaching member having portions deformed to conform to the curvature of portions of the outer hub and engaging the latter and secured thereto.

6. In a vehicle wheel, a sheet metal member consisting of a plurality of integrally formed spokes and an outer hub, and a single wheel attaching member constituting the sole support for the wheel secured to the hub, the hub having a plurality of portions engaging the wheel attaching member and attached thereto and deformed so as to conform to the shape thereof.

7. In a vehicle wheel, a sheet metal wheel body having a plurality of hollow spokes and an outer hub formed integral therewith, and a wheel attaching member secured to the outer hub and deformed to strengthen it, the points of attachment of the wheel attaching member with the outer hub and the deformations being located between the spokes.

8. In a vehicle wheel, a sheet metal wheel body composed of a plurality of hollow spokes and an outer hub formed integral therewith, and a wheel attaching member secured to the outer hub between the spokes and having strengthening deformations in line with the spokes.

9. In a demountable wheel, a one-piece stamped sheet metal unit constituting integrally formed spokes and a deep conical outer hub of large diameter, the axially inner portions of which comprise the curved joinders between adjacent spokes and a single wheel attaching member having a conical portion axially relatively shallow as compared to the outer hub mounted within and secured to the axially inner end of the outer hub between the spokes, said wheel attaching member also having a radial portion constructed for coaction with securing elements for detachably connecting the wheel to an axle flange, said wheel attaching member constituting the sole support for the wheel.

10. A wheel as claimed in claim 9 wherein one of said outer hub and conical portion of the wheel attaching member is deformed to conform to the shaping of the other thereof thereby providing circumferentially widened securing surfaces.

11. A wheel as claimed in claim 9 wherein the outer hub has concavely convexly formed portions between the spokes conforming to and attached to said conical portion of the wheel attaching member.

12. A wheel as claimed in claim 9 wherein the conical portion of the wheel attaching member has concave portions fittingly receiving and secured to the portions of the outer hub between the spokes.

13. A device as claimed in claim 9 wherein the spokes have roots extending axially outwardly of the axially outermost end of the conical portion of the wheel attaching member, together with means for closing the inner ends of the spoke roots axially outwardly of said conical portion.

OSCAR U. ZERK.